United States Patent [19]

Shimazawa et al.

[11] 4,343,596
[45] Aug. 10, 1982

[54] CONSTANT FLOW RATE LIQUID SUPPLY PUMP

[75] Inventors: Yoichi Shimazawa; Toshiaki Kawamoto, both of Nara, Japan

[73] Assignee: Sharp Kabushiki Kaisha, Osaka, Japan

[21] Appl. No.: 51,395

[22] Filed: Jun. 25, 1979

[30] Foreign Application Priority Data

Jun. 29, 1978 [JP] Japan .................... 53/79865
Jun. 29, 1978 [JP] Japan .................... 53/79866

[51] Int. Cl.³ .............. F04B 25/00; F04B 25/04; G01D 15/00
[52] U.S. Cl. .................... 417/252; 417/266; 417/268
[58] Field of Search ............ 417/521, 244, 266–268, 417/437, 254; 346/140 R; 92/48–51

[56] References Cited

U.S. PATENT DOCUMENTS

| | | | |
|---|---|---|---|
| 862,867 | 8/1907 | Eggleston | 417/390 |
| 1,271,712 | 7/1918 | Humphrey | 417/268 |
| 2,368,187 | 1/1945 | Williams | 417/521 |
| 2,928,351 | 3/1960 | Klinger | 92/49 |
| 3,139,156 | 6/1964 | Urso | 417/521 |
| 3,169,821 | 2/1965 | Miller | 346/140 |
| 3,488,763 | 1/1970 | Lofquist | 92/98 D |
| 3,761,953 | 9/1973 | Helgeson et al. | 346/75 |
| 3,765,802 | 10/1973 | Leitermann | 417/521 |
| 3,769,630 | 10/1973 | Hill et al. | 346/75 |
| 3,771,912 | 11/1973 | Conlee | 417/521 |
| 3,831,727 | 8/1974 | Kruspe et al. | 346/75 X |
| 3,844,689 | 10/1974 | Weatherston | 417/244 |
| 3,929,071 | 12/1975 | Cialone et al. | 346/140 R X |
| 3,930,258 | 12/1975 | Dick et al. | 346/75 |
| 3,961,337 | 6/1976 | Jung et al. | 346/75 X |
| 4,050,078 | 9/1977 | Isayama et al. | 346/140 R |
| 4,053,902 | 10/1977 | Skafvenstedt et al. | 346/140 R |
| 4,067,020 | 1/1978 | Arway | 346/140 R X |
| 4,079,384 | 3/1978 | Takano et al. | 346/140 R |
| 4,084,165 | 4/1978 | Skafvenstedt et al. | 346/140 R |
| 4,089,007 | 5/1978 | Perry et al. | 346/75 X |
| 4,204,215 | 5/1980 | Nakarai | 346/140 R |

FOREIGN PATENT DOCUMENTS

| | | | |
|---|---|---|---|
| 166769 | 1/1906 | Fed. Rep. of Germany | 417/254 |
| 427404 | 7/1924 | Fed. Rep. of Germany | 417/266 |
| 670037 | 1/1934 | Fed. Rep. of Germany | 417/254 |
| 2454956 | 5/1976 | Fed. Rep. of Germany | 417/266 |
| 2645851 | 4/1977 | Fed. Rep. of Germany | 346/140 R |
| 2273961 | 6/1974 | France | 417/534 |
| 2247111 | 2/1975 | France | 417/437 |
| 3058 | of 1884 | United Kingdom | 92/91 |

Primary Examiner—William L. Freeh
Attorney, Agent, or Firm—Birch, Stewart, Kolasch & Birch

[57] ABSTRACT

An ink liquid supply system for an ink jet system printer comprising an ink liquid reservoir for containing ink liquid therein, and a constant flow rate pump for supplying the ink liquid to a nozzle. The constant flow rate pump comprises a first chamber for introducing an ink liquid collected by a beam gutter of the ink jet system printer and for returning the ink liquid to the ink liquid reservoir. The constant flow rate pump further comprises a second chamber for introducing the ink liquid from the ink liquid reservoir and for developing the ink liquid to the nozzle. The first and second chambers include a coaxial piston disposed therein for varying the pressure created in the first and second chambers.

6 Claims, 2 Drawing Figures

CONSTANT FLOW RATE LIQUID SUPPLY PUMP

BACKGROUND AND SUMMARY OF THE INVENTION

The present invention relates to an ink liquid supply system for an ink jet system printer of the charge amplitude controlling type and, more particularly, to a constant flow rate pump for use in the ink liquid supply system.

A constant flow rate ink liquid supply pump is essential and required in an ink jet system printer of the charge amplitude controlling type to ensure an accurate printing. The constant flow rate pump is effective not only to stabilize the ink liquid speed emitted from a nozzle but also to maintain the ink viscosity at a fixed value.

Accordingly, an object of the present invention is to provide a constant flow rate pump for use in an ink liquid supply system of an ink jet system printer of the charge amplitude controlling type.

Another object of the present invention is to provide a constant flow rate pump which is small in size.

Still another object of the present invention is to provide a small pump which integrally includes a pressure chamber for supplying the ink liquid to a nozzle and another pressure chamber for introducing waste ink liquid from a beam gutter of the ink jet system printer of the charge amplitude controlling type.

Yet another object of the present invention is to provide a novel ink liquid supply system in an ink jet system printer of the charge amplitude controlling type.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a pump integrally includes three pressure chambers, which are divided by bellows and a three staged piston. The first pressure chamber functions to introduce the waste ink liquid collected by a beam gutter of the ink jet system printer of the charge amplitude controlling type. The second pressure chamber introduces the ink liquid from an ink liquid reservoir, and the third pressure chamber develops the ink liquid toward a nozzle of the ink jet system printer of the charge amplitude controlling type.

In a preferred form, a pressure accumulator is disposed between the outlet of the second pressure chamber and the inlet of the third pressure chamber in order to always maintain the pressure in the third pressure chamber higher than that in the second pressure chamber.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
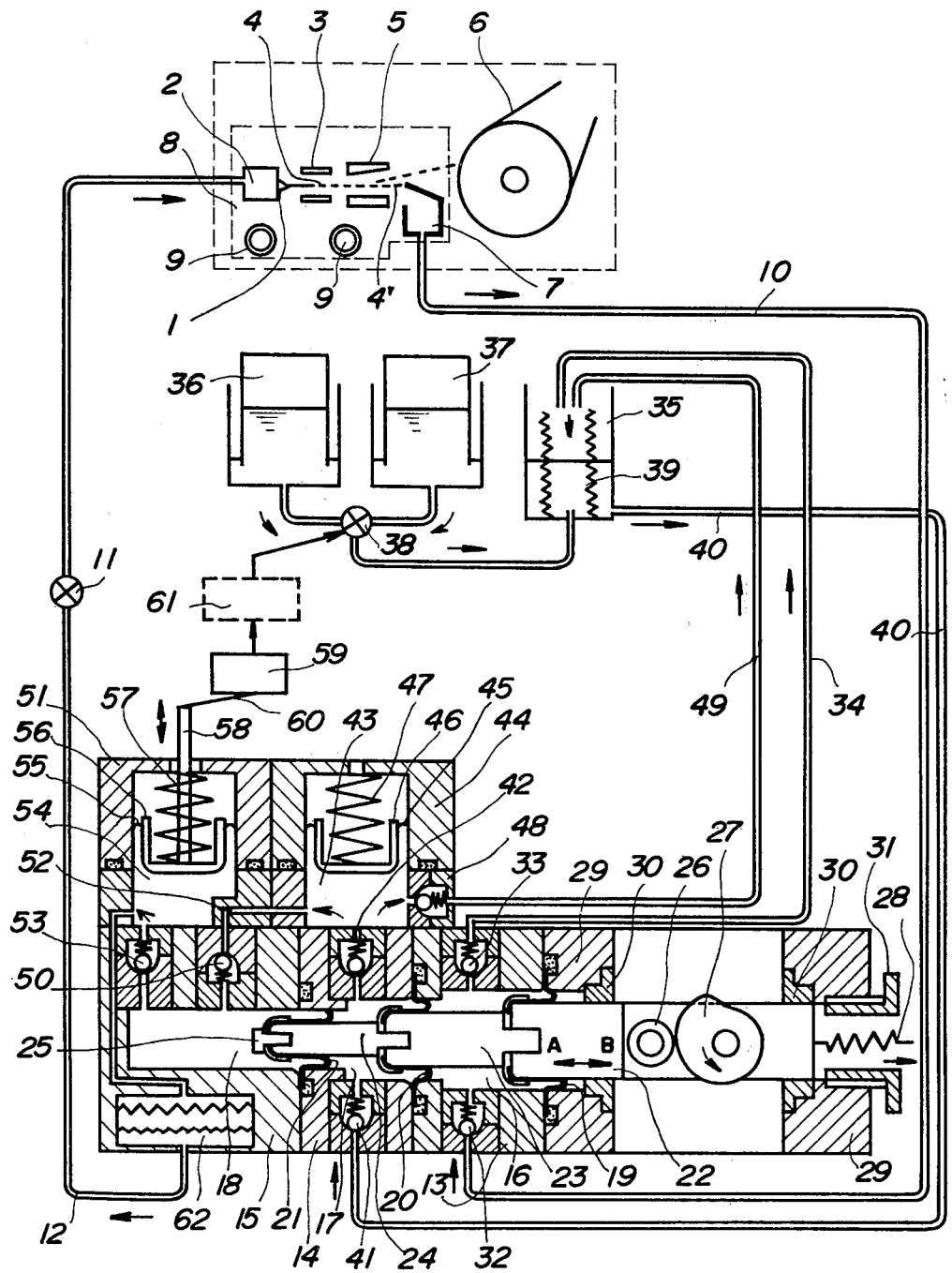
FIG. 1 is a block diagram of an ink liquid supply system for an ink jet system printer including an embodiment of a constant flow rate pump of the present invention.

FIG. 1 shows an ink jet system printer embodying the present invention.

The ink jet system printer mainly comprises a print forming section and an ink liquid supply system.

The print forming section of an ink jet system printer of the charge amplitude controlling type comprises a nozzle 1 for emitting an ink liquid supplied from the ink liquid supply system through an electromagnetic valve 11. An electromechanical transducer 2 is attached to the nozzle 1 to vibrate the nozzle 1 at a given frequency, thereby forming ink droplets 4 at the given frequency. The thus formed ink droplets 4, which are emitted from the nozzle 1, are charged through the use of a charging electrode 3 in accordance with a print information signal. The thus charged ink droplets 4 are deflected while they pass through a constant high voltage electric field established by a pair of deflection electrodes 5 in accordance with charge amplitudes carried thereon, and directed to a record receiving paper 6. Ink droplets 4' not contributing to the actual print operation are not charged and are directed to a beam gutter 7 for recirculation purposes.

The above-mentioned nozzle 1, electromechanical transducer 2, charging electrode 3, deflection electrodes 5 and beam gutter 7 are mounted on a carriage 8 (shown by broken lines), which is driven to reciprocate along slidable shafts 9 in the lateral direction. That is, the deflection caused by the deflection electrodes 5 is effected in the vertical direction, and the carriage 8 is driven to travel in the lateral direction, whereby desired patterns are formed on the record receiving paper 6 in the dot matrix fashion.

The ink liquid collected by the beam gutter 7 is returned to the ink liquid supply system through a conduit 10. The thus returned ink liquid is introduced into a constant flow rate pump, which develops the ink liquid of a fixed flow rate and a fixed viscosity to be applied to the nozzle 1 through a conduit 12 and the electromagnetic valve 11. The constant flow rate and constant viscosity ink liquid is highly required to ensure accurate printing or to stabilize the droplet formation.

The constant flow rate pump comprises three coaxial cylinders 13, 14 and 15, and three bellows 19, 20 and 21, which, in combination, determine three pressure chambers 16, 17 and 18. The pressure in each pressure chamber is varied by shifting the bellows 19, 20 and 21 along the axis of the cylinder. More specifically, the bellows 19 has a wider diameter than the bellows 20, which has a wider diameter than the bellows 21. The outer periphery of the bellows 19 is fixed between the cylinder 13 and a bearing supporter 29. The inner periphery of the bellows 19 is fixed to an end of a piston 22. The outer periphery of the bellows 20 is held between the cylinder 13 and cylinder 14, and the inner periphery thereof is secured to an end of a piston 23. The outer periphery of the bellows 21 is supported by the cylinders 14 and 15, and the inner periphery thereof is fixed to an end of a piston 24 through the use of a fixing cap and a screw 25. The pistons 22, 23 and 24 are coaxially connected to each other with the intervention of fixing caps and the inner peripheries of the bellows 19 and 20. The piston 22 has a wider diameter than the piston 23, which, in turn, has a wider diameter than the piston 24.

An eccentric cam 27 connected to a driven source (not shown), and a roller 26 are provided to shift the piston 22 in the direction shown by arrows A and B. A spring 28 is fixed to the other end of the piston 22 to bias the roller 26 into contact with the eccentric cam 27. When the piston 22 is reciprocated, the pistons 23 and 24 are also reciprocated in unison with the piston 22 and, therefore, the bellows 19, 20 and 21 perform the rolling movement. This creates the variation of the pressure in each pressure chamber 16, 17 and 18.

The piston 22 is slidably supported by a bearing 30, which is secured to the bearing supporter 29. The stroke value of the pistons 22, 23 and 24 is adjustable through the use of a flow rate adjusting screw 31 coupled to an opening of the bearing supporter 29. That is, the flow rate is controllable through the use of the flow rate adjusting screw 31.

An inlet valve 32 is provided in the cylinder 13 to communicate the pressure chamber 16 with the conduit 10 connected to the beam gutter 7. An outlet valve 33 is also provided in the cylinder 13 for communicating the pressure chamber 16 to a subtank 35 through a conduit 34. The subtank 35 receives the collected ink liquid through the conduit 34, and a new ink liquid contained in an ink cartridge 36 through a switching electromagnetic valve 38. The subtank 35 is constructed so that a constant amount of ink liquid is always contained therein.

An ink solvent cartridge 37 contains a solvent, which is selectively applied to the subtank 35 through the switching electromagnetic valve 38. A filter 39 is disposed in the subtank 35. The ink liquid contained in the subtank 35 is introduced into the pressure chamber 17 through the filter 39, a conduit 40 and an inlet valve 41.

The pressure chamber 17 is also connected to a pressure accumulator 43 via an outlet valve 42. The pressure accumulator 43 comprises a cylinder 44, a bellows 45 of which the outer periphery is fixed to the cylinder 44, and a spring 47 for depressing the bellows 45 downward via a cap 46. The cylinder 44 is provided with an outlet valve 48, which is connected to the subtank 35 through a conduit 49.

A conduit 52 is formed in the cylinder 44 and in another cylinder 51 in order to communicate the pressure-accumulator 43 with the pressure chamber 18 through an inlet valve 50 formed in the cylinder 15. The pressure chamber 18 is also communicated with another pressure accumulator 54 via an outlet valve 53 formed in the cylinder 15. The pressure accumulator 54 comprises the cylinder 51, a bellows 55 disposed in the cylinder 51, the outer periphery of the bellows 55 being fixed to the cylinder 51, and a spring 57 for depressing the bellows 55 downward via a cap 56.

A pole 58 is fixed to the cap 56 in such a manner that the pole 58 extends upward through the cylinder 51. The end of the pole 58 is associated with an actuator 60 of a microswitch 59. The microswitch 59 is associated with a valve drive circuit 61 for selectively switching the electromagnetic valve 38. As already discussed above, the switching electromagnetic valve 38 functions to selectively supply the subtank 35 with the new ink liquid contained in the ink cartridge 36 and the solvent contained in the ink solvent cartridge 37, thereby maintaining the ink viscosity at a constant value.

The pressure accumulator 54 is connected to the conduit 12 through a filter 62. The above-mentioned inlet or outlet valves comprise a ball valve, a valve seat and a spring for depressing the ball valve against the valve seat, respectively.

When the eccentric cam 27 is driven to rotate, the piston 22 is reciprocated. At the same time, the pistons 23 and 24 are reciprocated, whereby the ink liquid of the constant flow rate is emitted from the nozzle 1. The ink liquid collected by the beam gutter 7 is introduced into the pressure chamber 16 when the piston 22 is driven to travel in the direction shown by the arrow B. This is because the pressure in the pressure chamber 16 is reduced when the piston 22 travels in the direction shown by the arrow B due to the diameter difference between the bellows 19 and 20. The ink liquid introduced into the pressure chamber 16 is supplied to the subtank 35 when the piston 22 traveles in the direction shown by the arrow A, because the pressure in the pressure chamber 16 is increased.

As already discussed, the new ink is supplied from the ink cartridge 36 to the subtank 35 to maintain the amount of ink liquid contained in the subtank 35 at the constant value.

The pressure in the pressure chamber 17 is reduced when the pistons 22, 23 and 24 travel in the direction shown by the arrow B, because the bellows 20 is larger than the bellows 21. The inlet valve 41 is opened to introduce the ink liquid from the subtank 35 to the pressure chamber 17. The thus introduced ink liquid does not include any dust and bubbles because the filter 39 is disposed in the subtank 35. At this moment, the pressure in the pressure chamber 18 is reduced below the pressure in the pressure accumulator 43. Therefore, the ink liquid contained in the pressure accumulator 43 is introduced into the pressure chamber 18 through the inlet valve 50. The introduction of the ink liquid into the pressure chamber 18 is effectively conducted. This smooth introduction of the ink liquid ensures a constant flow rate ink liquid supply.

Contrarily, the pressure in the pressure chambers 17 and 18 is increased when the pistons 22, 23 and 24 travel in the direction shown by the arrow A. The ink liquid in the pressure chamber 17 is developed toward the pressure accumulator 43 through the outlet valve 42. The ink liquid in the pressure chamber 18 is supplied to the pressure accumulator 54 through the outlet valve 53. The ink liquid contained in the pressure accumulator 54 is fed to the nozzle 1 through the filter 62, where the dust is removed, the conduit 12 and the electromagnetic valve 11.

Therefore, the nozzle 1 emits the ink liquid at a constant flow rate.

The ink liquid amount developed from the pressure chamber 18 to the pressure accumulator 54 is less than that from the pressure chamber 17 to the pressure accumulator 43 and, therefore, there is a possibility that the pressure in the pressure accumulator 43 or the pressure chamber 17 may become greater than that in the pressure chamber 18. In this case, the outlet valve 48 is opened when the pressure in the pressure accumulator 43 becomes greater than a preselected value, whereby the ink liquid contained in the pressure accumulator 43 is directed to the subtank 35 through the conduit 49. Therefore, when the pistons 22, 23 and 24 travel in the direction shown by the arrow A, the pressure in the pressure accumulator 43 never becomes higher than that in the pressure chamber 18 and the inlet valve 50 is not opened. More specifically, the pressure in the pressure accumulator 43 is held below the predetermined value to preclude the deformation of the bellows 21. As discussed above, the pressure in the pressure chamber 18 is always higher than that in the pressure chamber 17 without regard to the travel direction of the pistons 22, 23 and 24. Therefore, the ink liquid supplied through the conduit 12 shows the constant flow rate as long as the bellows 21 is not deformed and the cam 27 is rotated at a constant speed. That is, the ink liquid is emitted from the nozzle 1 at the constant flow rate.

Figure 2:
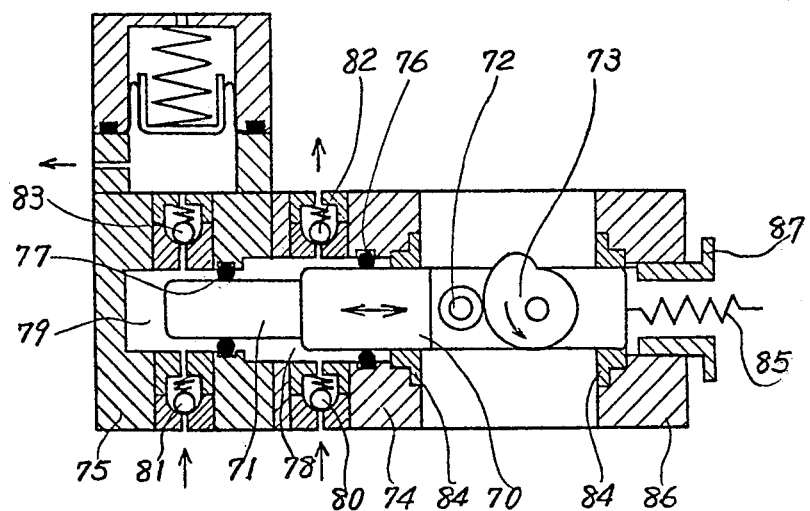
FIG. 2 is a sectional view of another embodiment of a constant flow rate pump of the present invention.

FIG. 2 shows another embodiment of the constant flow rate pump of the present invention.

The constant flow rate pump of FIG. 2 mainly comprises two coaxial pistons 70 and 71, the piston 70 having a longer diameter than the piston 71, and stair shaped coaxial cylinders 74 and 75. An eccentric cam 73 connected to a driving source (not shown) and a roller 72 connected to the piston 70 are provided for reciprocating the pistons 70 and 71. O-shaped rubber rings 76 and 77 are secured to the cylinders 74 and 75, respectively, to define pressure chambers 78 and 79. An inlet valve 80 is provided for the pressure camber 78, and an outlet valve 82 is provided for the pressure chamber 78. An inlet valve 81 and an outlet valve 83 are provided for the pressure chamber 79. The piston 70 is slidably supported by a bearing 84 which is secured to a bearing supporter 86.

The end of the piston 70 is fixed to a spring 85, whereby the roller is maintained in contact with the eccentric cam 73. A screw 87 is secured to the end of the bearing supporter 86 to adjust the stroke value of the pistons 70 and 71.

The inlet valve 80 is connected to the beam gutter 7 for recovering the collected ink liquid, and the outlet valve 82 is connected to the subtank 35. The inlet valve 81 is connected to the subtank 35 for introducing the ink liquid into the pressure chamber 79, and the outlet valve 83 is connected to the nozzle 1 through the pressure accumulator, the conduit 12 and the electromagnetic valve 11.

The invention being thus described, it will be obvious that the same may be varied in many ways. Such variations are not to be ragarded as a departure from the spirit and scope of the invention, and all such modifications are intended to be included within the scope of the following claims.

What is claimed is:

1. A three-stage pump for an ink liquid supply system for an ink jet system printer, said ink jet system printer comprising a nozzle for emitting an ink liquid supplied from said ink liquid supply system and a beam gutter for collecting waste ink droplets emitted from said nozzle and for recovering the ink liquid toward said ink liquid supply system, said ink liquid supply system comprising:
   an ink liquid reservoir for containing the ink liquid therein; and
   a constant flow rate pump comprising:
      a cylinder including at least a large diameter section, an intermediate diameter section and a small diameter section;
      a reciprocating piston disposed in said cylinder;
      at least two resilient sealing means disposed between said cylinder and said reciprocating piston for defining first, second and third variable volume pressure chambers;
      a first inlet valve formed in said cylinder for communicating said first pressure chamber to said beam gutter;
      a first outlet valve formed in said cylinder for communicating said first pressure chamber to said ink liquid reservoir;
      a second inlet valve formed in said cylinder for introducing the ink liquid from said ink liquid reservoir into said second pressure chamber;
      a second outlet valve formed in said cylinder for developing the ink liquid from said second pressure chamber;
      a third inlet valve formed in said cylinder for introducing the ink liquid developed from said second outlet valve into said third pressure chamber;
      a third outlet valve formed in said cylinder for communicating said third pressure chamber to said nozzle;
      said piston being movable relative to said cylinder to vary the volume of said first, second and third variable volume pressure chambers to pump ink liquid from said first pressure chamber through said first outlet valve, from said second pressure chamber through said second outlet valve, and from said third pressure chamber through said third outlet valve in a forward direction of piston reciprocation and for introducing ink liquid into said first pressure chamber through said first inlet valve, to said second pressure chamber through said second inlet valve, and to said third pressure chamber through said third inlet valve in a reverse direction of piston reciprocation; and
      accumulator means operatively connected to said second outlet valve and said third inlet valve for maintaining a higher pressure in said third pressure chamber than the pressure in said second pressure chamber.

2. A three-stage pump for an ink liquid supply system according to claim 1, wherein said reciprocating piston is associated with an eccentric cam for reciprocating said piston in said cylinder at a given rate.

3. A three-stage pump for an ink liquid supply system according to claim 1, wherein said first, second and third inlet and outlet valves comprise one-way check valves.

4. A three-stage pump for an ink liquid supply system according to claim 1, and further including an adjustment means for adjusting the reciprocation of said piston within said cylinder.

5. A three-stage pump for an ink liquid supply system according to claim 5, wherein said at least two resilient sealing means comprises bellows members being spaced axially along said piston, a first bellows member including an outer peripheral portion secured to the intermediate diameter section of said cylinder and an inner central peripheral portion secured to said piston and a second bellows member including an outer peripheral portion secured to the small diameter section and an inner central peripheral portion secured to said piston.

6. A three-stage pump for an ink liquid supply system according to claim 5, wherein said first bellows member is larger in diameter than the second bellows member.

* * * * *

UNITED STATES PATENT AND TRADEMARK OFFICE
CERTIFICATE OF CORRECTION

PATENT NO. : 4,343,596
DATED : August 10, 1982
INVENTOR(S) : Shimazawa et al.

It is certified that error appears in the above—identified patent and that said Letters Patent is hereby corrected as shown below:

On the title page, (75) Inventors, change "Toshiaki Kawamoto" to -- Toshiaki Tabuchi --.

Signed and Sealed this

Twenth-eighth Day of September 1982

[SEAL]

Attest:

GERALD J. MOSSINGHOFF

Attesting Officer

Commissioner of Patents and Trademarks